United States Patent
Mellor

(10) Patent No.: US 12,159,160 B1
(45) Date of Patent: Dec. 3, 2024

(54) SYSTEMS AND METHODS FOR OPTIMIZING OF DATA PROCESSING

(71) Applicant: NBCUniversal Media, LLC, New York, NY (US)

(72) Inventor: David Mellor, Lynnfield, MA (US)

(73) Assignee: NBCUniversal Media, LLC, New York, NY (US)

( * ) Notice: Subject to any disclaimer, the term of this patent is extended or adjusted under 35 U.S.C. 154(b) by 585 days.

(21) Appl. No.: 17/580,339

(22) Filed: Jan. 20, 2022

(51) Int. Cl.
*G06F 9/48* (2006.01)
*G06Q 30/0283* (2023.01)

(52) U.S. Cl.
CPC ....... *G06F 9/4818* (2013.01); *G06Q 30/0283* (2013.01)

(58) Field of Classification Search
None
See application file for complete search history.

(56) References Cited

U.S. PATENT DOCUMENTS

| | | | | |
|---|---|---|---|---|
| 6,032,123 A * | 2/2000 | Jameson | ................ | G06Q 10/04 700/99 |
| 7,092,918 B1 * | 8/2006 | Delurgio | ............ | G06Q 30/0206 705/400 |
| 7,249,032 B1 * | 7/2007 | Close | ................. | G06Q 30/0283 705/400 |
| 7,386,519 B1 * | 6/2008 | Delurgio | ................ | G06Q 10/04 705/400 |
| 8,020,161 B2 * | 9/2011 | Markov | ................ | G06F 9/4818 718/103 |
| 9,367,601 B2 * | 6/2016 | Babu | ................... | G06F 11/3419 |
| 10,620,989 B2 * | 4/2020 | Yuan | ..................... | G06F 9/4887 |
| 10,671,445 B2 * | 6/2020 | Nucci | ...................... | G06N 5/01 |
| 11,620,155 B2 * | 4/2023 | Yuan | ..................... | G06F 9/4818 718/103 |

OTHER PUBLICATIONS

Kiran et al. "Lambda Architecture for Cost-effective Batch and Speed Big Data processing", 2015 IEEE, pp. 2785-2792.*
Li et al. "Accelerating Big Data Analytics Using Scale-up/out Heterogeneous Clusters", 2019 IEEE, 9 pages.*
Sharma et al. "An Improved Heuristic Schedule Approach of Task Scheduling for Big Data processing System", 2014 IEEE, pp. 1-7.*
Gautam et al. "A Survey on Job Scheduling Algorithms in Big Data Processing", 2015 IEEE, 11 pages.*

* cited by examiner

*Primary Examiner* — Van H Nguyen
(74) *Attorney, Agent, or Firm* — Fletcher Yoder, P.C.

(57) ABSTRACT

A tangible, non-transitory, machine-readable medium, including machine-readable instructions that, when executed by one or more processors, cause the one or more processors to identify an optimal machine configuration and a number of optimal machines to complete a job. The one or more processors may further dynamically generate a matrix of available equivalent machine configurations and a corresponding number of machines for each available equivalent machine configuration and provide a preferred machine configuration and a number of machines having the preferred machine configuration for completing the job, where the preferred machine configuration comprises the optimal machine configuration or a machine configuration from the dynamically generated matrix.

20 Claims, 4 Drawing Sheets

SYSTEMS AND METHODS FOR OPTIMIZING OF DATA PROCESSING

BACKGROUND

The present disclosure generally relates to optimizing cost for big data processing and, more particularly, to dynamically identifying cost-effective machines to process jobs related to big data.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as admissions of prior art.

In the era of big data, enterprises may need to process vast amounts of data every day. As a result, processing the large volumes of data may require multiple machines with multiple and different types of configurations depending on the job. However, it may prove incredibly costly for the enterprise to maintain the physical machines on premises as required to process large amounts of data. Enterprises may use third-party cloud services that provide cloud service machines to perform the desired job processing with different cost structures for different types of cloud services. For example, third-party cloud services may allow enterprises to utilize un-interruptible or interruptible machines for data processing. The cost for utilizing interruptible machines may be significantly lower than the costs for utilizing un-interruptible machines, but the tradeoff is that using interruptible machines could make the job completion less reliable since another party could take over the interruptible machine by paying a higher price.

A desired job may use an optimal machine configuration and a number of optimal machines to complete the desired job in a desired time frame before interruption. However, the optimal machine configuration and number of optimal machines may not be available and equivalent machine configurations and equivalent numbers of machines may be sought out to complete the desired job. As such, systems and methods for dynamically identifying equivalent machine configurations to complete data processing jobs may be desired.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a tangible, non-transitory, machine-readable medium, including machine-readable instructions that, when executed by one or more processors, cause the one or more processors to identify an optimal machine configuration and a number of optimal machines to complete a job. The one or more processors may further dynamically generate a matrix of available equivalent machine configurations and a corresponding number of machines for each available equivalent machine configuration and provide a preferred machine configuration and a number of machines having the preferred machine configuration for completing the job, where the preferred machine configuration comprises the optimal machine configuration or a machine configuration from the dynamically generated matrix.

In another embodiment, a method for generating an equivalence matrix may include identifying an optimal machine configuration and a corresponding optimal number of machines having the optimal machine configuration. The method may further include running a dynamic machine prediction to generate the equivalence matrix. The dynamic machine prediction may include identifying, based on the optimal machine configuration, one or more equivalent machine configurations and a corresponding equivalent number of machines having the equivalent machine configuration for processing a job at a particular time and ordering the one or more equivalent machine configurations and the corresponding equivalent number of machines. The method may further include identifying cluster options for job completion based on the equivalence matrix and the optimal machine configuration.

In a further embodiment, a system may include a data repository comprising data to be processed and cluster allocation logic, configured to select an equivalent machine configuration, from an equivalence matrix, to identify a cloud service cluster tasked with performing a processing job on the data. The system may further include a job controller communicatively coupled to the cluster allocation logic, configured to schedule a processing job to process the data, by requesting allocation of the cloud service cluster in accordance with the equivalent machine configuration selected by the cluster allocation logic.

DRAWINGS

These and other features, aspects, and advantages of the present disclosure will become better understood when the following detail description is read with reference to the accompanying drawings in which like characters represent like parts throughout the drawings, wherein.

DETAILED DESCRIPTION

Figure 1:
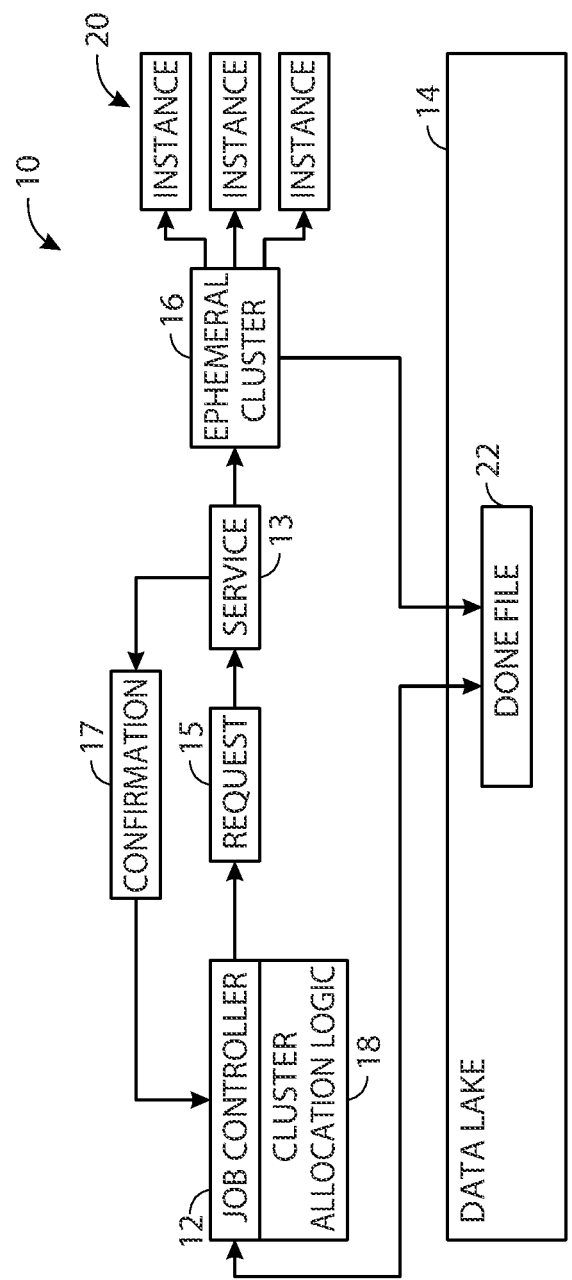
FIG. 1 illustrates a big data processing system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiment of the present disclosure, the articles "a." "an," "the," and "said" are intended to mean that there are one or more of these elements. The terms "comprising." "including." and "having" are intended to be inclusive and mean that there may be additional elements other than the listed elements.

As discussed above, a big data platform may be utilized in various contexts, such as in advertising, marketing, business, research and development, or the like. As a result, the big data platform may include machines configured to receive and process large amounts of data (e.g., hundreds of gigabytes or terabytes of data) every single day. The machines may be owned and operated by the enterprise controlling the big data platform. However, operating and maintaining the machines required to process vast amounts of data may prove costly to the enterprise controlling the big data platform. Thus, it has become increasingly more common for the enterprises who utilize big data platforms to purchase cloud-based operating and processing capabilities through a third-party service provided by a third-party service provider.

The third-party service provider may operate and lease cloud-based machines to the enterprises through direct, on-demand markets and/or an interruptible machine market. The on-demand market may allow the enterprises to make sure that they will be able to utilize the cloud-based machines for as long as they need until the processing job is completed without interruption. By contrast, the interruptible machine market allows the enterprises to utilize a cost-effective option by requesting machines that were not purchased through the on-demand market. Systems and methods for utilizing such interruptible machine market are provided in U.S. patent application Ser. No. 17/713,702, entitled "Systems and Methods for Optimizing of Data Processing." filed on May 13, 2021, which is herein incorporated by reference in its entirety.

The downside of the interruptible market is that the machine running the current processes may be interrupted if another enterprise decides to purchase the machine through the on-demand market. To remedy this, an algorithm may be used for identifying and requesting one or more equivalent cloud-based machines from the third-party service interruptible machine market to optimize cost, that are unlikely to result in interrupted processing by preferential processing of the "on demand" market, to help ensure the completion of the requested processes via the big data platform. To identify the one or more equivalent cloud-based machines, historical data including interruption rates and cost of a particular equivalent cloud-based machine at a particular time may be incorporated into the algorithm. That is, the algorithm may create dynamic lists of equivalent cloud-based machines based on an equivalence matrix and a regression algorithm to predict upcoming costs of the particular equivalent cloud-based machine at the particular time in the future. These techniques also increase the efficient use of available machines and resources that would otherwise be running idle.

With the foregoing in mind, FIG. 1 illustrates an efficiency system 10 communicatively coupled to a data platform that provides efficient execution of data processing to reduce processing costs while increasing utilization of under-utilized machines of a cloud-based data processing service. Referring to FIG. 1, the efficiency system 10 may include a job controller 12 to carry out the data processing operations (e.g., jobs). The job controller 12 may be one or more processors that facilitate one or more jobs to process data.

The job controller 12 may access a data lake 14 to obtain unprocessed data. The data lake 14 may be a local or cloud-based data repository that receives data from an external source. In some embodiments, the data lake 14 may include one or more data repositories to accommodate the vast amounts of data required to run jobs. In certain embodiments, the data lake 14 may include partitions for different types of data that is stored within the one or more data repositories. The data lake 14 may receive the data at the same time every day or at any point during the day.

The data stored in the data lake 14 may be related to data analytics. Data analytics may utilize predictive analytics, user behavior analytics, or the like to analyze data sets too large or complex to be analyzed using conventional means. As discussed above, the data may be sourced from advertising data, marketing data, business data, research and development data, government data, healthcare data, Internet browsing data, and/or the like. In order to process the data and run the required jobs for the processing of the data, the jobs may require one or more machines. However, as discussed above, operating and maintaining the one or more machines required to process vast amounts of data may prove costly to the enterprise controlling the efficiency system 10.

The job controller 12 may perform data cleaning operations on the data lake 14 to ensure that the data sourced from the data lake 14 is usable for data processing. In some embodiments, the job controller 12 may parse through the data lake 14 utilizing certain parameters to delete data that is deemed not useful for processing and/or otherwise only acquire data that is useful for processing.

As such, the job controller 12 may utilize one or more cloud-based machines provided by a third-party provider on the big data platform through a service 13 provided by the third-party provider to process the big data. The service 13 may include an interface to access the one or more cloud-machines provided by the third-party provider. In some embodiments, the service 13 may be run by a party requesting the utilization of the one or more cloud-based machines. The job controller 12 may send a request 15 to the service 13 to utilize the one or more cloud-based machines to process the big data. The service 13 may transmit a confirmation message 17 back to the job controller 12 based at least in part upon the request 15. The confirmation message 17 may include feedback information including the validity, the completion, or the failure of completion of the request 15. Each job may be processed as an ephemeral cluster 16 on the one or more cloud-based machines. The ephemeral cluster 16 may include one or more components of a specific job for processing data from the data lake 14.

To create the request to the service 13 to utilize the data platform to create the ephemeral cluster 16, the job controller 12 may utilize cluster allocation logic 18, which may be a component of the job controller 12 and/or an independent component communicatively coupled to the job controller 12. The cluster allocation logic 18 may include one or more algorithms which, when executed, determine a desired makeup of the ephemeral cluster 16. By way of example, the job controller 12 may identify the makeup of the ephemeral cluster 16, by identifying particular machine types and/or a number of machines to request to request for the ephemeral cluster 16. As may be appreciated, the job controller 12 may account for the makeup that is capable of processing an identified job, while also attempting to minimize interruption caused by processing of the un-interruptible market, which allows for processing that can interrupt/supersede processing by a cluster of machines purchased through the interruptible market. In some embodiments, the cluster allocation logic 18 may utilize the one or more processors utilized by the job controller 12. In other embodiments, the cluster allocation logic 18 may be performed on another set of one or more processors communicatively coupled to the job controller 12. In identifying the makeup of the ephemeral cluster 16, the one or more algorithms of the cluster allocation logic 18 may utilize information from the data lake 14, the job controller 12, historical data of past ephemeral clusters, or the like.

The ephemeral cluster 16 may include one or more instances 20, which run the one or more components of the specific job. The one or more instances 20 may include each of the one or more processes that in totality comprise the ephemeral cluster 16. The instance 20 may be related to a computing instance on a machine that runs each of the one or more processes. The machine may be run on the cloud-based machine.

Once the job is completed, the ephemeral cluster 16 may transmit the output of the job to the data lake 14. In addition to the output of the job, the ephemeral cluster 16 may transmit a done file 22 to indicate that the current job is complete. The job controller 12 may be constantly polling for the done file 22 to initiate the next job. In some embodiments, the job controller 12 may transmit the done file 22 to the data lake 14.

Executing and completing the jobs of the efficiency system 10 may require one or more specific machines with one or more specific requirements. While these jobs can be completed locally, it may prove costly to maintain multiple local machines. As such, it is advantageous to utilize a third-party service providing one or more cloud-based machines and performing the jobs of the efficiency system 10 on the one or more cloud-based machines. As described above, the third-party service may operate and lease cloud-based machines to the enterprises through direct, on-demand markets and/or an interruptible machine market on interruptible machines. The on-demand market may allow the enterprises to make sure that they will be able to utilize the cloud-based machines for as long as they need without interruption. The requesting process on interruptible machines may allow for the enterprises to utilize a cost-effective option by requesting on machines that were not purchases through the on-demand market.

Figure 2:
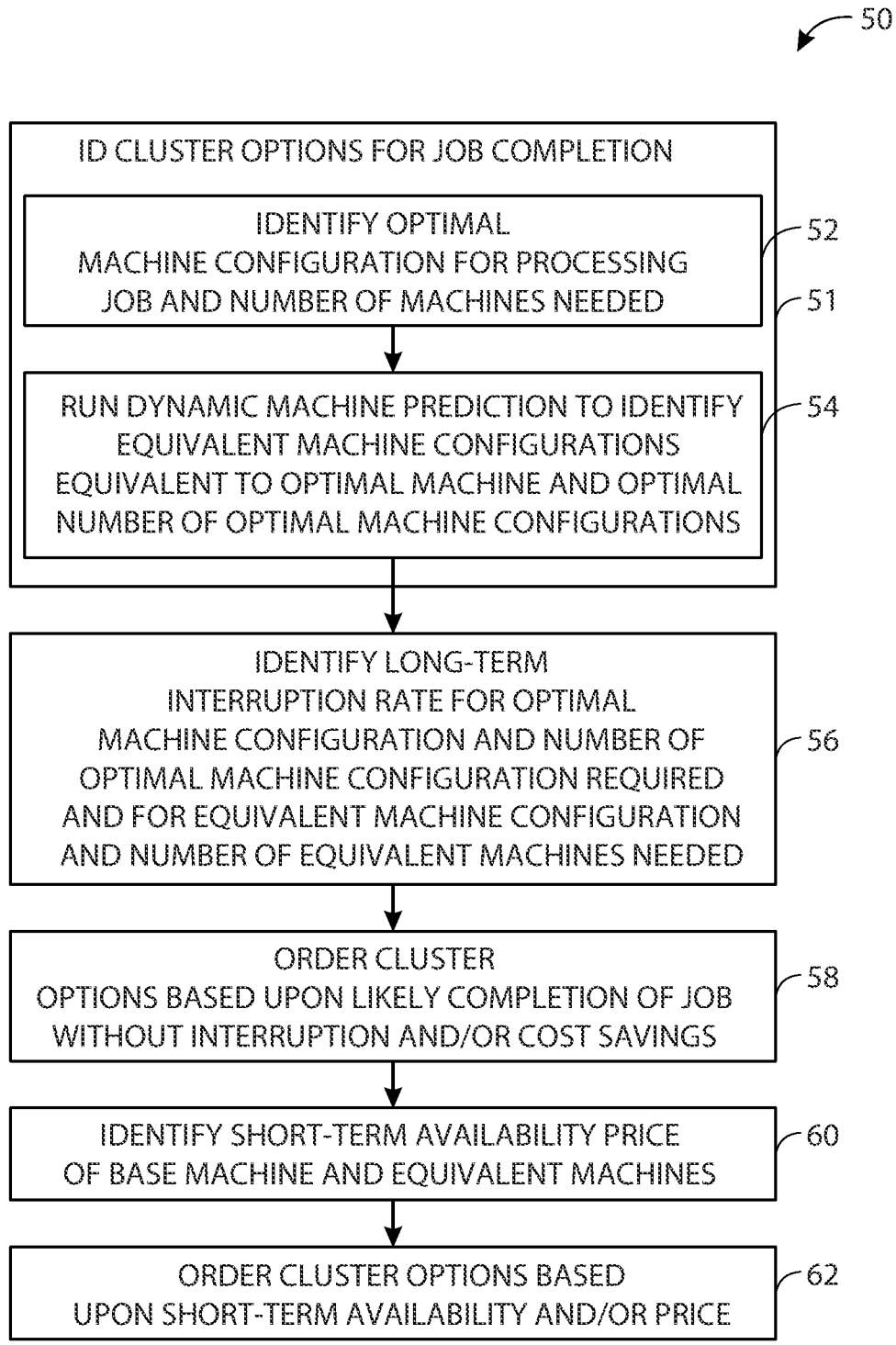
FIG. 2 illustrates a flow chart of a process for identifying cluster options for job completion and creating an ordered list for requesting the cluster options, in accordance with an embodiment.

The third-party service may release information surrounding the leasing, operating, and availability of the interruptible machines on an un-used/under-used market. Utilizing this information, required machines to carry out the jobs of the efficiency system 10 may be determined. With the foregoing in mind, FIG. 2 illustrates a flow chart of a method 50 for identifying cluster options for job completion and creating an ordered list for requesting the cluster options. Although the method 50 is described as being in a particular order, it should be noted that the method 50 may be performed in any suitable order and one or more blocks described with respect to the method 50 may be omitted or skipped.

First, cluster options for job completion are identified (block 51). At block 52, optimal machine configurations and a number of optimal machines may be identified for processing the job. The optimal machine configurations and the number of optimal machines may correspond to general processing requirements for completing a job within a timeframe. A machine configuration may include a total number of CPUs and total amount of memory. When identifying the optimal machine configuration, the CPU to memory ratio may be determined by the total number of CPUs and total amount of memory included in the machine configurations to identify an optimal machine configuration for processing a job. By way of example, one machine configuration may be a machine with 32 CPUs, 128 gigabytes of memory, and a ratio of 4 gigabytes of memory/CPU. The job may require 8 machines of this example machine configuration, in which the total number of CPUs will be 256 and the total memory will be 1024 gigabytes. It should be understood that while the unit of gigabytes is utilized to describe the memory of the machines in the current embodiments, any unit of memory may be acceptable and utilized.

The third-party service may provide one or more types of machines. In some embodiments, one machine type provided by the third-party service may include optimizations different than another machine type. By way of example, one type of machine may be optimized for memory purposes, while in other embodiments, the type of machine may be optimized for processor purposes. Each machine configuration may be available in one or more different availability zones. The availability zone may be a particular geographical region. In some embodiments, depending on the types of jobs to be processed by the efficiency system 10, the ephemeral cluster 16 makeup may require all machines to be within the same availability zone. In other embodiments, no such requirement may be warranted.

In certain embodiments, the optimal machine configurations and the number of machines for processing the job may be pre-determined based upon past jobs that are within a certain similarity threshold of the current job. The similarity threshold may be determined based upon the type of job, the size of the job, the complexity of the job, and/or the like. In other embodiments, the optimal machine configurations and the number of machines for processing the job may be dynamically determined.

Identifying the ephemeral cluster 16 makeup options (block 51) may also include identifying equivalent machine configurations to the optimal machine and optimal number of optimal machines that could be used for the job completion (block 54). At block 54, a dynamic machine prediction algorithm may be run to dynamically identify equivalent machine configuration configurations equivalent to the optimal machine and optimal number of optimal machines. The process of the dynamic machine prediction algorithm will be discussed more in depth below in FIG. 3.

In the event that the optimal machine configuration and the number of optimal machines are not available or has not become optimal anymore, the equivalent machine configurations and a corresponding number of equivalent machines having the equivalent machine configurations may become the optimal machine configurations.

The equivalent machine configurations and the number of equivalent machines may be determined based upon identifying configurations with a similar CPU to memory ratio (or memory to CPU ratio) as the optimal configuration/makeup. By way of example, the optimal machine configurations may require 8 machines with the CPU to memory ratio of 8 gigabytes/CPU. The equivalent machine configurations may be identified as 16 machines with the CPU to memory ratio of 4 gigabytes/CPU. Another equivalent machine configuration may be identified as 4 machines with the CPU to memory ratio of 16 gigabytes/CPU. These machine configuration and type equivalences may be pre-determined and utilized for all jobs. In certain embodiments, the equivalences may be dynamically determined based upon the job.

There may be multiple different options identified at block 54. That is, one or more equivalent machine configurations and a corresponding number of equivalent machines may be identified. The dynamic machine prediction algorithm may identify all of the possible equivalences that may be stored along with the optimal machine configuration. The optimal machine configuration and the number of optimal machines and for the equivalent machine configurations and the number of equivalent machines may be considered cluster options for job completion.

At block 56, a long-term interruption rate for the optimal machine configuration and the number of optimal machines and for the equivalent machine configurations and the number of equivalent machines may be identified. The interruption rate of a particular machine configuration may be related to the probability that the third-party service will interrupt an in-progress job on a leased machine that was leased from the interruptible market when a lease of the machine is purchased through the on-demand market and/or a higher rate was offered by a different party for use of the interruptible. The third-party service may publish a statistic for each machine configuration and the probability that each machine configuration will be interrupted, which may be considered the long-term interruption rate. The long-term statistic may be calculated weekly, bi-weekly, monthly, or yearly.

At block 58, the cluster options may be ordered based upon a probability of completing the job without interruption on the most cost-effective machines. The optimal machine configuration and the number of optimal machines along with the equivalent machine configurations and the number of equivalent machines that are considered the cluster options may be ordered into a list, where a first machine configuration/number of machines makeup set on the list corresponds to a most desirable cluster makeup option (e.g., the lowest interruption rate, the most cost-effective, and/or a particular balance between the interruption rate and cost-effectiveness). By way of example, one machine set may have a lower interruption rate than another machine set, but may be more costly. Thus, a trade-off may be made to determine which machine set is the most cost effective while still meeting certain interruption criteria.

At block 60, a short-term interruption rate (e.g., rate at which a given configuration of machine purchased on the interruptible machine market has been interrupted by purchase of the given configuration in the on-demand market) and/or a price for the optimal machine configuration and the number of optimal machines and for the equivalent machine configurations and the number of equivalent machines may be identified. The short-term interruption rate may be the interruption rate of the machine over a short time period. The short time period may be a minute, an hour, a day, or any combination thereof. By way of example, the third-party service may update the interruption rate of the machines every 10 minutes. The time period for the short-term interruption rate may be shorter than the time period for the long-term interruption rate.

The price for each machine may be updated at the same rate as the interruption rate. The price data identified may be the historical price paid for the machine (sometimes for a given availability zone) and the latest price paid for the machine (sometimes for the given availability zone). In some embodiments, the current price of the machine on the on-demand market may be identified along with the historical price paid and the latest price paid. In other embodiments, any combination of the three prices may be identified.

At block 62, the cluster options may be ordered based upon the short-term interruption rate and/or the price information. In some embodiments, a short-term pricing/availability rate (e.g., expected short-term price and/or predicted non-interrupted availability) may be calculated based upon continually updated data related to the short-term interruption rate, the current offered prices, the offered prices of related machine configurations, and/or the availability of the requested machines within particular availability zones. In some embodiments, the price information may be the price information collected at block 60. In certain embodiments, the ordered list created at block 58 may be re-organized based upon the data collected at block 60. This new list may be ordered in the same process as the ordered list of block 58, where the first machine set on the list corresponds to the lowest short-term interruption rate that is the most cost-effective. In other embodiments, re-ordering the ordered list may require the identification of new equivalent machine configurations and the number of equivalent machines. This may occur if more than a threshold number of machines of a certain equivalent machine configuration have been purchased on the on-demand market at any time during the method 50. It should be noted that each machine configuration may be paired with a rank, which determines the order of the list. In an aspect, the order of the list may be determined based on just the ordering in block 58 without the ordering in block 62 or based on just the ordering in block 62 without the ordering in block 58.

Figure 3:
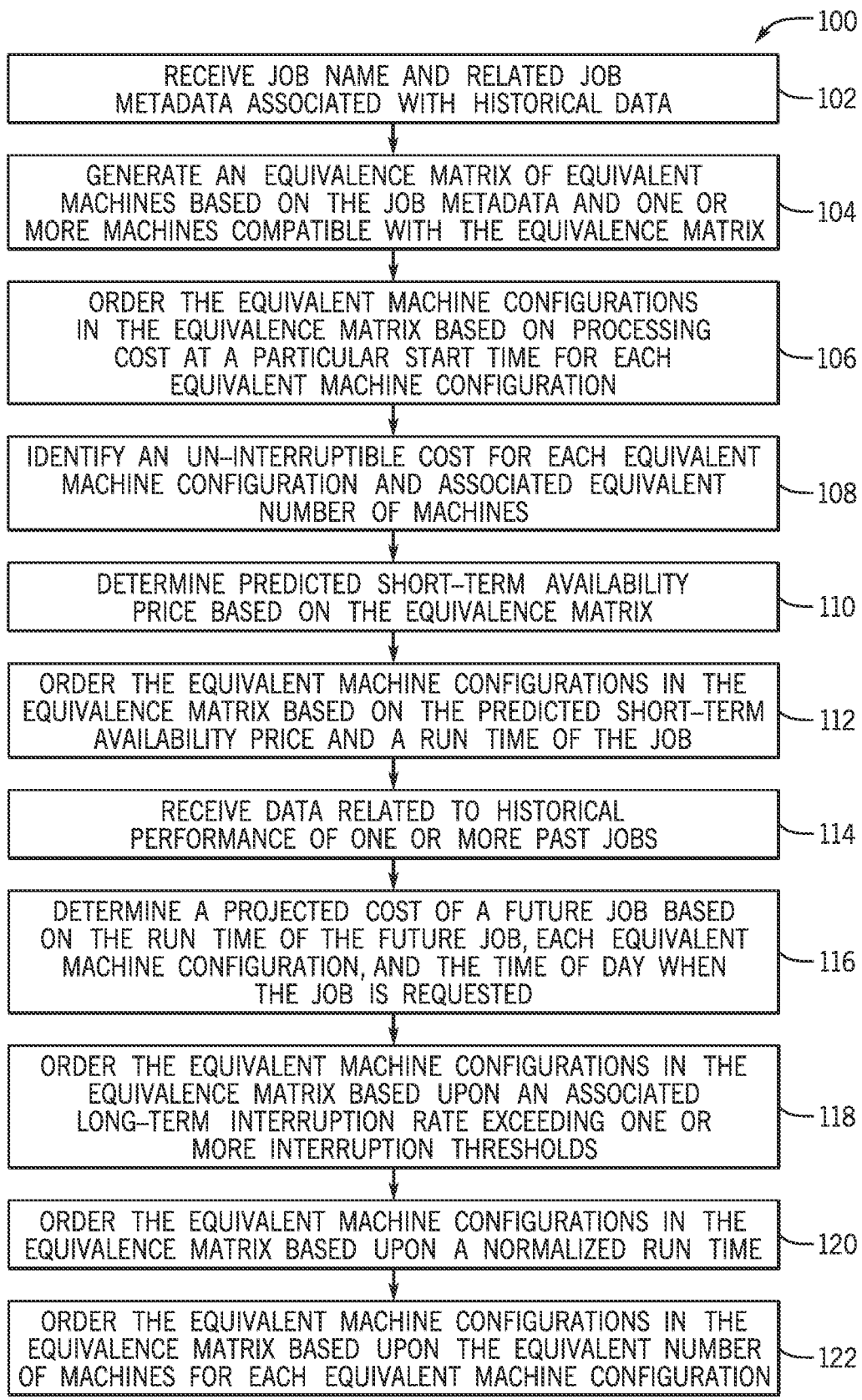
FIG. 3 illustrates a flow chart of a process for running a dynamic machine prediction to identify equivalent machine configurations, in accordance with an embodiment.

As stated above, at block 54, the dynamic machine prediction algorithm may identify the equivalent machine configurations and number of the equivalent machine configurations equivalent to the optimal machine and optimal number of optimal machine configurations. With the foregoing in mind, FIG. 3 illustrates a flow chart of a method 100 for running the dynamic machine prediction algorithm. Although the method 100 is described as being in a particular order, it should be noted that the method 100 may be performed in any suitable order and one or more blocks described with respect to the method 100 may be omitted or skipped.

At block 102, a job name and job metadata associated with historical data may be received. The job name may be received via a user input and/or an automatically generated generic name based upon the job metadata and/or historical data. The job name may be associated with the job at block 52. Moreover, the job name may be associated with an amount of data (e.g., in gigabytes) to be processed. In some embodiments, a particular job name may be associated with a previously determined job with a set range of data (e.g., between 100 gigabytes and 300 gigabytes). The job metadata associated with historical data may include a start time (e.g. AM or PM), minimum number of CPUs, and/or a CPU to memory ratio associated with past jobs. By way of example, a particular job identical and/or similar to previously run jobs may have started at 12:00 A.M., used a minimum of 32 CPUs, and a ratio of 8 gigabytes/CPU.

At block 104, an equivalence matrix of equivalent machine configurations and number of equivalent machines may be generated based on the job metadata. Furthermore, at block 52 in FIG. 2, the optimal machine configuration for the processing job and number of machines requested may be identified. One or more equivalent machine configurations and a number of equivalent machines may be identified based upon the optimal machine configuration for the processing job and number of machines. The identified equivalent machine configurations may form the equivalence matrix, where the equivalence matrix may include the identified equivalent machine configurations and each associated number of equivalent machines.

At block 106, the equivalent machine configurations in the equivalence matrix may be ordered (or prioritized) based on cost for processing the job at a particular start time for each equivalent machine configuration. That is, a prediction may be determined for the cost of a job using each equivalent machine configuration and associated number of equivalent machines at the particular start time. To generate the prediction, a regressive algorithm may be used. It should be noted that there are several implementations of this algorithm that may be used (e.g., a time-regressive algorithm). Furthermore, based at least on a set of predictions for the equivalence matrix, the equivalent machine configurations may be ordered such that the lowest cost equivalent machine configurations are ordered higher than the higher cost equivalent machine configurations.

At block 108, an un-interruptible cost for each equivalent machine configuration and associated number of equivalent machines may be identified. The un-interruptible market may be searched to identify the un-interruptible cost for each equivalent machine configuration and associated number of equivalent machines. At block 110, a predicted short-term availability price for each equivalent configuration in the equivalence matrix may be determined. The predicted short-term availability price may be determined via a ratio of the predicted cost determined at block 106 to the un-interruptible cost identified at block 108 for each equivalent machine configuration. The resulting ratio is the predicted short-term availability price.

At block 112, the list of equivalent machines in the equivalence matrix may be ordered based on the predicted short-term availability price and a run time of the job. The run time of the job may be based on a length of time needed to complete a job using each equivalent machine configuration. That is, the run time of the job may vary based on the equivalent machine configuration and number of equivalent machines. The equivalent machine configurations may be ordered such that the lowest short-term availability price and/or shortest run time associated with equivalent machine configurations are ordered higher than the highest short-term availability price and/or longest run time associated with equivalent machine configurations.

At block 114, data related to historical performance of one or more past jobs may be received. The data may include the job, the machine configuration and number of machines used for the job, the run time of the job, a time of day when the job is requested, and/or a long-term interruption rate. That is, the historical performance of the one or more past jobs may include the interruption rate of the one or more past jobs. As discussed above, the interruption rate of a particular machine configuration may be related to the probability that the third-party service will interrupt an in-progress job on a leased machine that was leased from the interruptible market when a lease of the machine is purchased through the on-demand market and/or a higher rate was offered by a different party for use of the interruptible.

At block 116, a projected cost of a future job may be determined based on the run time of the future job, each equivalent machine configuration, and the time of day when the job is requested. By way of example, a future job requested at 10 P.M. may have a lower projected cost compared to a future job requested at 2 P.M. Additionally, the cost of different equivalent machine configurations at the time of requested may be factored into the projected cost. Furthermore, a future job with a longer run time may cost more than a future job with a shorter run time. In some embodiments, the projected cost of the future job may be determined for each equivalent machine configuration and number of equivalent machines in the list of equivalent machine configurations.

At block 118, one or more equivalent machines may be ordered within the previously ordered list based upon an associated long-term interruption rate exceeding one or more interruption thresholds. The interruption thresholds may include a plurality of interruption thresholds in a tiered system. By way of example, when the long-term interruption rate is greater than a first interruption threshold (e.g., greater than a 20% interruption rate), the associated equivalent machine configuration may be removed from the ordered list entirely. When the long-term interruption rate is greater than a second interruption threshold (e.g., greater than a 10% interruption rate) and less than the first interruption threshold, the associated equivalent machine configuration may be assigned to a lower position further down the list compared to other equivalent machine configurations. When the long-term interruption rate is greater than a third interruption threshold (e.g., greater than a 5% interruption rate) and/or less that the first and second interruption thresholds, the associated equivalent machine configuration may be assigned to a position that is higher than a particular equivalent machine configuration that has an interruption rate greater than the second interruption threshold. In some embodiments, there may be multiple different interruption thresholds and each interruption threshold may weigh the associated equivalent machine configuration differently.

At block 120, the ordered list may be ordered based upon a normalized run time. That is, each run time associated with the historical data received at block 114 is normalized and the list is ordered based on the normalized run times to reduce costs.

In some embodiments, to normalize the run times, a ratio for each equivalent machine configuration of the CPU to memory ratio may be converted to a processing unit value (e.g., an integer value). The value and the run time of the past jobs associated with the equivalent machine configuration may be factored into an equation that produces the normalized run time. This normalization is performed due to an increase in memory generally leading to a decrease in run time (e.g., faster processing) for jobs that include complex processing tasks. That is, an equivalent machine configuration with an equivalent number of CPUs to another equivalent machine configuration may perform a job in less time due to having more memory.

In some embodiments (e.g., when the job has a large magnitude of relatively simple tasks), the normalized run time may be based upon increased efficiency experienced from a number of CPUs. In such a case, an equivalent machine configuration with a higher number of CPUs may be ordered higher than the equivalent machine configuration with more available memory, as CPU resources may be the more relied upon variable for completion of such jobs. The magnitude of the job may be related to a number of computations for each job. By way of example, the equivalent machine configuration with a higher number of CPUs may be ordered higher for a job with a higher number of simple computations and the equivalent machine configuration with more available memory may be ordered higher for a job with a relatively lower number of complex computations. These factors may be accounted for in the normalized run time calculations of each equivalent machine configuration.

At block 122, the ordered list may be ordered based upon the number of equivalent machines for each equivalent machine configuration. When processing a job, a smaller number of machines with more CPUs per machine may be preferable to a larger number of machines with less CPUs per machine. As such, a weight may be applied such that a first equivalent machine configuration with more CPUs per machine with a lower number of machines are moved higher in the ordered list compared to a second equivalent machine configuration with less CPUs per machine with a higher number of machines.

Figure 4:
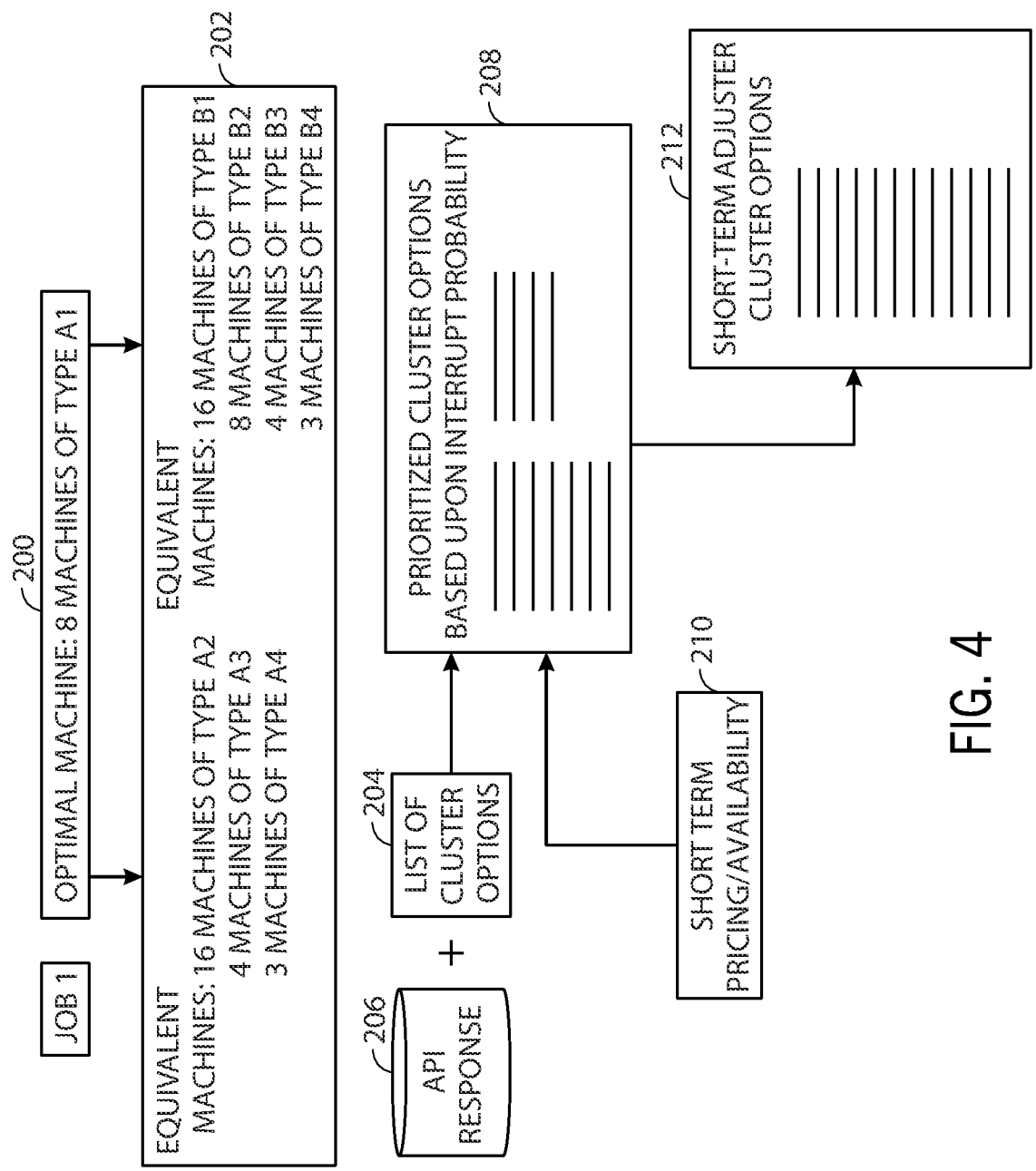
FIG. 4 illustrates an example of the process to identify and allocate clusters based upon best available cluster options, in accordance with an embodiment.

With the foregoing in mind, FIG. 4 illustrates an example of the process to identify and allocate clusters based upon best available cluster options. An optimal machine set 200 may be determined to be eight machines of a Type A1 machine configuration from the data platform, which has a processor-prioritized configuration with 128 GB of memory and 32 CPUs (and thus a 4 gigabyte to CPU ratio). The optimal machine set 200 may be determined based upon the type of job and the amount of data in the data lake 14 required for the job. The equivalent machine sets 202 may be determined based upon the optimal machine set 200. As discussed above, the memory to CPU ratio is the most significant determining factor when determining equivalent machine sets 202. Other important factors may be the number of machines, the availability of certain machine configurations within certain availability zones, and/or any other factor that is affected by the type of job and the amount of data.

Shown in the equivalent machine sets 202 are some examples of machine sets with the number of machines and the machine configurations that are equivalent to the optimal machine set 200. By way of example, one equivalent machine configuration may be 16 machines of a Type A2 configuration, which has a 64 GB and 16 CPU configuration (and thus a 4 gigabytes/CPU ratio) or 4 machines of a Type A3 configuration, which has a configuration of 256 GB and 64 CPUs (and thus a 4 gigabytes/CPU ratio). As described above, there may be more than one type of machine that is equivalent. By way of example, a first set of equivalences may be processor-optimized (e.g., Type A machines), while a second set of equivalences may be memory-optimized (e.g., Type B machines, which is a different family of machines that maintains the 4 gigabytes/CPU ratio). Different types of machine configurations and numbers of machines within each of these optimizations may be created and stored. In some embodiments, the processor-optimized and memory-optimized machines may be sorted into different classes of machines, where a certain class of machines may be preferred before another class of machines. By way of example, if the optimal machine configuration is the Type A2, then the first equivalent machine class may list machines in a common class (e.g., Type A instances, which are processor-optimized configurations) and the second equivalent machine class may list machines with memory-optimized configurations (e.g., Type B instances).

The optimal machine set 200 and the equivalent machine sets 202 may be listed as an unordered list of cluster options 204. To order the list, an API response 206 may be determined and the factors utilized to rank each cluster option can be obtained. These factors may include the long-term interruption rate, the historical pricing information, and the available machine configurations within each availability zone.

In combination with the API response 206, the unordered list of cluster options 204 may be converted into a prioritized cluster options list 208. The prioritized cluster options list 208 may be primarily organized based upon the interruption rate and/or cost factors determined from the API response 206. The cluster options may be ordered through a ranking system, where the best option for cluster allocation is ranked the highest and the list continues down in order of next best cluster option.

The prioritized cluster options list 208 is further ordered and changed based upon the short-term pricing/availability 210. As described above, the short-term pricing/availability 210 may be based upon continually updated data related to the short-term interruption rate, the current offered prices, the offered prices of related machine configurations, and/or the availability of the requested machines within particular availability zones. Based upon the short-term pricing/availability 210, the prioritized cluster options list 208 may be converted into a short-term adjusted cluster option list 212. The short-term adjusted cluster option list 212 may contain the final list before the cluster allocation process begins.

By employing the techniques described in the present disclosure, the systems and the methods described herein may allow for the optimization of cost for big data processing by allocating clusters in a cost-effective and efficient manner. The efficiency system 10 may utilize the job controller 12 to allocate the ephemeral cluster 16 with one or more instances 20 to complete the job utilizing the data of the data lake 14. In some embodiments, the optimal and the equivalent machine configurations and the respective numbers of machines may be identified to complete the job of the efficiency system 10. Utilizing the identified machines, both short-term and long-term interruption rates, and additional historical data, the dynamic machine prediction algorithm may generate the ordered list with the ordered respective equivalent machine configurations and associated equivalent number of machine configurations.

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A tangible, non-transitory, machine-readable medium, comprising machine-readable instructions that, when executed by one or more processors, cause the one or more processors to:
   identify an optimal machine configuration and a number of optimal machines to complete a job;
   dynamically generate a matrix of available equivalent machine configurations and a corresponding number of machines for each available equivalent machine configuration, by:
      generating an equivalence matrix of available equivalent machines based on one or more machines equivalent to the optimal machine configuration;
      determining a predicted short-term availability price for each equivalent machine configuration in the equivalence matrix; and
      ordering the equivalent machine configurations in the equivalence matrix based on at least one of: a processing cost at a particular start time for each equivalent machine configuration, the predicted short-term availability price for each equivalent machine configuration, or a predicted run time of a job for each equivalent machine configuration; and
   provide a preferred machine configuration and a number of machines having the preferred machine configuration for completing the job, wherein the preferred machine configuration comprises the optimal machine configuration or a machine configuration from the dynamically generated matrix.

2. The tangible, non-transitory, machine-readable medium of claim 1, wherein dynamically generating the matrix comprises:
   identifying an un-interruptible cost for each equivalent machine configuration and associated equivalent number of machines;
   determining the predicted short-term availability price for each equivalent machine configuration in the equivalence matrix based upon a ratio of the processing cost at the particular start time for each equivalent machine configuration and the un-interruptible cost for each equivalent machine configuration; and
   ordering the equivalent machine configurations in the equivalence matrix based on the predicted short-term availability price.

3. The tangible, non-transitory, machine-readable medium of claim 2, wherein dynamically generating the matrix comprises
   determining a projected cost of a future job based on the run time of the future job, each equivalent machine configuration, and a time of day when the job is requested; and
   ordering the equivalent machine configurations in the equivalence matrix based upon an associated long-term interruption rate exceeding one or more interruption thresholds.

4. The tangible, non-transitory, machine-readable medium of claim 3, wherein dynamically generating the matrix comprises:
   ordering the equivalent machine configurations in the equivalence matrix based upon a normalized run time; and
   ordering the equivalent machine configurations in the equivalence matrix based upon the equivalent number of machines for each equivalent machine configuration.

5. The tangible, non-transitory, machine-readable medium of claim 1, comprising:
   receiving job metadata associated with historical data; and
   generating the equivalence matrix of equivalent machines based on the job metadata.

6. The tangible, non-transitory, machine-readable medium of claim 5, wherein the job metadata associated with the historical data comprises the particular start time of the job, a minimum amount of central processing units (CPUs) used to perform one or more jobs in the historical data, a CPU to memory ratio of machine configurations used to perform the one or more jobs in the historical data, or any combination thereof.

7. The tangible, non-transitory, machine-readable medium of claim 1, comprising receiving data related to historical performance of one or more past jobs, wherein the historical performance of the one or more past jobs comprises associated interruption rates for the one or more past jobs.

8. The tangible, non-transitory, machine-readable medium of claim 1, wherein providing the preferred machine configuration and the number of machines having the preferred machine configuration comprises:
   determining an optimal cluster option for a data processing job, wherein the optimal cluster option comprises the optimal machine configuration and a corresponding optimal number of machines having the optimal machine configuration;
   determining, based on the equivalence matrix, one or more equivalent cluster options comprising equivalent configurations and a corresponding equivalent number of machines having the equivalent configuration to the optimal configuration; and
   generating an ordered cluster options list that prioritizes the optimal cluster option and the one or more equivalent cluster options based upon long-term interruption rates, short-term availability, expected pricing or any combination thereof.

9. The tangible, non-transitory, machine-readable medium of claim 3, wherein the one or more interruption thresholds comprises a first interruption threshold and a second interruption threshold, wherein the first interruption threshold is greater than the second interruption threshold.

10. The tangible, non-transitory, machine-readable medium of claim 9, comprising, upon the long-term associated interruption rate for a first equivalent machine configuration being greater than the first interruption threshold, removing the first equivalent machine configuration from the equivalence matrix.

11. The tangible, non-transitory, machine-readable medium of claim 10, comprising:
    upon the associated interruption rate of the first equivalent machine configuration being less than the first interruption threshold and greater than the second interruption threshold and lower than the first interruption threshold, ordering the first equivalent machine configuration to a lower position; and
    upon the associated interruption rate of a second equivalent machine configuration being less than the first interruption threshold and the second interruption threshold, ordering the second equivalent machine configuration to a higher position than the first equivalent machine configuration.

12. A method for generating an equivalence matrix, comprising:
    dynamically identifying an optimal machine configuration and a corresponding optimal number of machines having the optimal machine configuration;
    running a dynamic machine prediction to generate the equivalence matrix, wherein the dynamic machine prediction comprises:
       identifying, based on the optimal machine configuration, one or more equivalent machine configurations and a corresponding equivalent number of machines having the equivalent machine configuration for processing a job at a particular time; and
       ordering the one or more equivalent machine configurations and the corresponding equivalent number of machines, by:
          determining a predicted short-term availability price for each equivalent machine configuration in the equivalence matrix; and
          ordering the equivalent machine configurations in the equivalence matrix based on at least one of: a processing cost at a particular start time for each equivalent machine configuration, the predicted short-term availability price for each equivalent machine configuration, or a predicted run time of a job for each equivalent machine configuration; and
    identifying cluster options for job completion based on the generated equivalence matrix and the optimal machine configuration.

13. The method of claim 12, wherein ordering the one or more equivalent machine configurations and the corresponding equivalent number of machines comprises:
    ordering the equivalent machine configurations in the equivalence matrix based on processing cost at the particular start time for each equivalent machine configuration;

identifying an un-interruptible cost for each equivalent machine configuration and associated equivalent number of machines;

determining a predicted short-term availability price for each equivalent machine configuration in the equivalence matrix;

ordering the equivalent machine configurations in the equivalence matrix based on the predicted short-term availability price and run time of a job;

determine a projected cost of a future job based on the run time of the future job, each equivalent machine configuration, and a time of day when the job is requested;

order the equivalent machine configurations in the equivalence matrix based upon an associated long-term interruption rate exceeding one or more interruption thresholds;

order the equivalent machine configurations in the equivalence matrix based upon a normalized run time; and order the equivalent machine configurations in the equivalence matrix based upon the equivalent number of machines for each equivalent machine configuration.

14. The method of claim 13, comprising receiving data related to historical performance of one or more past jobs, wherein the historical performance of the one or more past jobs comprises the associated interruption rates for the one or more past jobs.

15. The method of claim 13, comprising receiving job metadata associated with historical data, wherein the job metadata comprises the particular start time of the job, a minimum amount of central processing units (CPUs) used to perform one or more jobs in the historical data, a CPU to memory ratio of machine configurations used to perform the one or more jobs in the historical data, or any combination thereof.

16. The method of claim 12, comprising:
   identifying, from the equivalence matrix, one or more equivalent cluster options comprising the equivalent machine configurations and the corresponding equivalent number of machines to the optimal configuration and the corresponding optimal number of machines by:
      identifying a memory to central processing unit (CPU) ratio of the optimal configuration and the corresponding optimal number of machines; and
      identifying, from the equivalence matrix, one or more machine configurations that match or exceed the memory to CPU ratio along with the corresponding number of machines that would match or exceed a total memory, total CPU power, or both of the optimal configuration and the corresponding optimal number of machines.

17. A system, comprising:
   one or more processors;
   a data repository comprising data to be processed by the one or more processors;
   cluster allocation logic executed by the one or more processors to:
      dynamically generate a matrix of available equivalent machine configurations and a corresponding number of machines for each available equivalent machine configuration, by:
         generating an equivalence matrix of available equivalent machines based on one or more machines equivalent to an optimal machine configuration;
         determining a predicted short-term availability price for each equivalent machine configuration in the equivalence matrix; and
         ordering the equivalent machine configurations in the equivalence matrix based on at least one of: a processing cost at a particular start time for each equivalent machine configuration, the predicted short-term availability price for each equivalent machine configuration, or a predicted run time of a job for each equivalent machine configuration; and
      select an equivalent machine configuration, from the equivalence matrix, to identify a cloud service cluster tasked with performing a processing job on the data; and
   a job controller communicatively coupled to the cluster allocation logic, the job controller is executed by the one or more processors to schedule a processing job to process the data, by requesting allocation of the cloud service cluster in accordance with the equivalent machine configuration selected by the cluster allocation logic.

18. The system of claim 17, wherein the cluster allocation logic is executed by the one or more processors to generate the equivalence matrix by:
   identifying an optimal machine configuration and number of optimal machines;
   identifying one or more equivalent machine configurations based on one or more machines equivalent to the optimal machine configuration;
   ordering the equivalent machine configurations in the equivalence matrix based on processing cost at a particular start time for each equivalent machine configuration;
   identifying an un-interruptible cost for each equivalent machine configuration and associated equivalent number of machines;
   determining a predicted short-term availability price for each equivalent machine configuration in the equivalence matrix;
   ordering the equivalent machine configurations in the equivalence matrix based on the predicted short-term availability price and run time of the job;
   determining a projected cost of a future job based on the run time of the future job, each equivalent machine configuration, and a time of day when the job is requested;
   ordering the equivalent machine configurations in the equivalence matrix based upon an associated long-term interruption rate exceeding one or more interruption thresholds;
   ordering the equivalent machine configurations in the equivalence matrix based upon a normalized run time; and
   ordering the equivalent machine configurations in the equivalence matrix based upon the equivalent number of machines for each equivalent machine configuration.

19. The system of claim 18, wherein the cluster allocation logic is executed by the one or more processors to identify the one or more equivalent machine configurations by:
   identifying a memory to central processing unit (CPU) ratio of an optimal machine configuration; and
   identifying machine configurations that match or exceed the memory to CPU ratio and a corresponding number of machines that would match or exceed memory and CPU resources of the optimal machine configuration, as the one or more equivalent machine configurations.

20. The system of claim 18, wherein the cluster allocation logic is executed by the one or more processors to use a regressive algorithm to determine the predicted short-term availability price.

* * * * *